United States Patent [19]
Yarkosky et al.

[11] Patent Number: 5,844,702
[45] Date of Patent: Dec. 1, 1998

[54] BIDIRECTIONAL OPTICAL FIBER TRANSMISSION SYSTEM WITH REFLECTION SIGNAL MONITOR

[75] Inventors: Francis Raymond Yarkosky, Kansas City, Mo.; William Chaklam Szeto, Overland Park, Kans.

[73] Assignee: Sprint Communications Co, L.P., Kansas City, Mo.

[21] Appl. No.: 514,472

[22] Filed: Aug. 11, 1995

Related U.S. Application Data

[63] Continuation of Ser. No. 971,803, Nov. 5, 1992, abandoned.

[51] Int. Cl.[6] .................................................. H04B 10/08
[52] U.S. Cl. ........................... 359/110; 357/112; 356/73.1
[58] Field of Search ..................... 359/110, 112, 359/117, 125, 128, 173; 356/73.1

[56] References Cited

U.S. PATENT DOCUMENTS

| | | | |
|---|---|---|---|
| 4,297,684 | 10/1981 | Butter | 340/557 |
| 4,435,849 | 3/1984 | Ilgner et al. | 359/110 |
| 4,436,365 | 3/1984 | Hodgins et al. | 385/24 |
| 4,636,019 | 1/1987 | Johansson et al. | 359/112 |
| 4,833,668 | 5/1989 | Rowley et al. | 359/110 |
| 4,911,515 | 3/1990 | So et al. | 359/110 |
| 4,931,771 | 6/1990 | Kahn | 340/556 |
| 4,961,644 | 10/1990 | Marsden | 356/73.1 |
| 4,973,169 | 11/1990 | Slonecker | 359/110 |
| 5,027,434 | 6/1991 | Brahms et al. | 359/113 |
| 5,062,704 | 11/1991 | Bateman | 356/73.1 |
| 5,063,595 | 11/1991 | Ballance | 359/110 |
| 5,093,568 | 3/1992 | Maycock | 359/110 |
| 5,206,923 | 4/1993 | Karlsson | 385/12 |
| 5,319,482 | 6/1994 | Tsuchiya et al. | 359/110 |
| 5,361,157 | 11/1994 | Ishikawa et al. | 359/168 |

FOREIGN PATENT DOCUMENTS

| | | | |
|---|---|---|---|
| 0139437 | 6/1987 | Japan | 359/110 |
| 0074834 | 3/1989 | Japan | 359/110 |
| 0127829 | 5/1990 | Japan | 359/110 |

*Primary Examiner*—Rafael Bacares
*Attorney, Agent, or Firm*—Harley R. Ball; Jeo W. Caven

[57] ABSTRACT

A system of bidirectional transmission of optical signals over an optical fiber in a telecommunications network includes a transceiver unit having an optical signal transmitter and receiver coupled with each end of the fiber, and a signal monitor for detecting a predetermined deviation in the signal strength directed toward each receiver from the fiber. This predetermined deviation is indicative of a signal path disruption in the fiber resulting in at least partial signal reflection of the signals from a transmitter toward the receiver of the same set.

4 Claims, 1 Drawing Sheet

BIDIRECTIONAL OPTICAL FIBER TRANSMISSION SYSTEM WITH REFLECTION SIGNAL MONITOR

This application a continuation of Ser. No. 07/971,803 filed Nov. 5,1992 abandoned.

BACKGROUND OF INVENTION

1. Field of the Invention

The present invention is concerned with the field of telecommunications using optical fibers for transmission of optical signals. More particularly, the invention is concerned with a telecommunications system having an optical signal transmitter and receiver set coupled with each end of an optical fiber for implementing bidirectional transmission thereover, and a monitor for monitoring the signal strength to each receiver in order to detect signal reflections caused by signal path disruption in the fiber.

2. Description of the Prior Art

The most advanced telecommunications networks carry all traffic over optical fibers. In a typical configuration, optical fibers are arranged in pairs with one fiber carrying traffic in one direction and the other fiber carrying traffic in the opposite direction. When additional capacity is needed, one prior art solution involves installing additional equipment for transmitting optical signals in two wavelength windows —for example, transmitting at both 1310nm and 1550nm over the same fiber. This can effectively double the capacity of a given fiber but requires the installation of new types of equipment to handle the additional wavelength transmissions.

Another solution includes placing additional optical fiber pairs in service. As can be appreciated, however, additional optical fibers may not be available and installation of new cables can be very expensive.

A third prior art solution has been to convert an existing fiber to bidirectional signal transmission in which optical signals are conveyed in both directions. In such an arrangement, a transmitter and a receiver are coupled with each end of a fiber. A problem develops, however, if the fiber is damaged and presents a break or crack. In such a situation, signals from a transmitter can be reflected at the point of disruption and return along the fiber to the receiver coupled with the same end of the fiber as the transmitter.

SUMMARY OF THE INVENTION

The present invention solves the prior art problems discussed above and presents a distinct advance in the state of the art. More particularly, the system hereof allows bidirectional transmission of optical signals along the optical fiber while detecting signal reflections caused by disruption in the optical path of the fiber.

Broadly, the invention hereof includes a bidirectional, optical fiber transmission system having a signal monitor for monitoring the strength of the optical signals directed to a receiver and having an optical switch coupled with the monitor for opening the signal path to the receiver in response to a predetermined deviation in the signal strength. More particularly, the preferred signal monitor includes an optical signal splitter, a signal processor and an optical switch. The splitter is coupled in the path of the optical signals directed toward a receiver and provides a portion of the signals to the processor. The processor determines the signal strength of the received signals and detects a predetermined deviation in the signal strength. When such a deviation is detected, an output from the processor activates the optical switch, also coupled in the signal path to the receiver, whereupon the switch opens. With the opening of the switch, the receiver activates an alarm.

DETAILED DESCRIPTION OF THE PREFERRED EMBODIMENT

Figure 1:
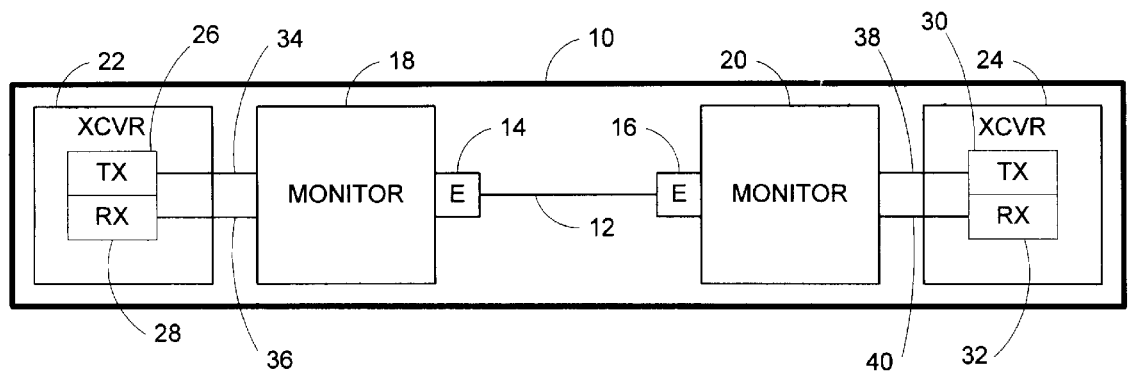
FIG. 1 is a schematic representation of the bidirectional fiber optic transmission system of the present invention.

FIG. 1 schematically illustrates bidirectional transmission system 10 including optical fiber 12 presenting opposed ends 14 and 16, signal monitors 18 and 20 respectively coupled with fiber ends 14 and 16, and transceiver units 22 and 24 respectively coupled with monitors 18 and 20.

Figure 2:
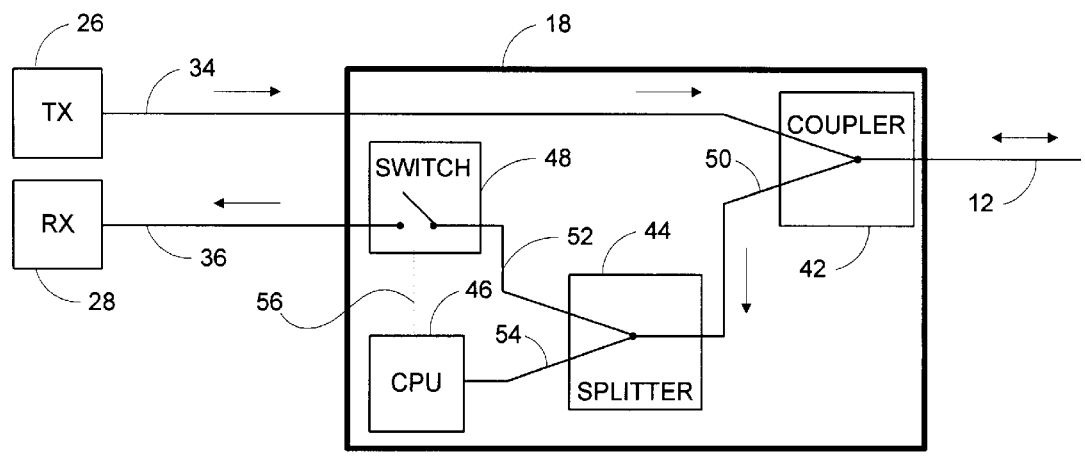
FIG. 2 is a schematic representation of the signal monitors of FIG. 1.

Transceiver unit 22 includes optical signal transmitter (Tx) 26 and optical signal receiver (Rx) 28; transceiver unit 24 includes transmitter 30 and receiver 32. Transmitter 26 and receiver 28 are coupled with signal monitor 18 by way of respective optical fiber segments 34 and 36; and transmitter 30 and receiver 32 are coupled with signal monitor 20 by respective optical fiber signals 38 and 40. This configuration implements bidirectional optical signal transmission over fiber 12. More particularly, signals produced by transmitter 26 are conveyed in one direction over fiber 12 to receiver 32; and transmissions from transmitter 30 are conveyed in the second opposed direction over fiber 12 to receiver 28. Referring now to FIG. 2, each signal monitor 18,20 is preferably a PBA Optical Card also available Fitel-Photomatrix, Inc. as part of the DFX4000 system, and includes optical signal bidirectional coupler 42, optical signal splitter 44, signal processor 46, and electrically activatable, optical switch 48. As those skilled in the art appreciate, the terms coupler and splitter are used interchangeably and refer to the function of the device in use rather than the structure itself. In this regard, coupler 42 receives optical signals from one of transmitters 26,30 and couples those signals onto fiber 12.

Optical signals transmitted along fiber 12 in the opposed direction are diverted by coupler 42 to splitter 44 by way of optical fiber segment 50 as shown in FIG. 2. Splitter 44 is a conventional 90/10 splitter whereby 90% of the signal strength is passed by way of optical fiber segment 52 to optical switch 48 and then to a respective receiver 28,32. The remaining 10% of the signal strength passed to signal processor 46 by way of optical fiber segment 54. Electrical line 56 couples signal processor 46 with optical switch 48 for controlled activation thereof. Signal processor 46 converts the incoming optical signal on line 54 into an electrical signal which is then analyzed for signal strength.

In normal operation, signal processor 46 of each monitor 18,20 activates the respective optical switch 48 thereof to the closed position in order to pass optical signals to the associated receiver 28 or 32. During bidirectional signal transmission, optical signals produced by transmitter 26 are conveyed by fiber segment 34 to signal monitor 18 which couples the signals to fiber 12 for transmission therealong to signal monitor 20. Signal monitor 20 then conveys a portion of the signals by way of fiber segment 40 to receiver 32. Conversely, signals produced by transmitter 30 are conveyed by fiber segment 38 to signal monitor 20 which couples these signals to fiber 12 for transmission therealong in the opposite direction for receipt by receiver 28 by way of signal monitor 18.

Signal processor 46 monitors the optical signals directed from fiber 12 to the associated receiver by monitoring the 10% portion directed to processor 46 by splitter 44. In other words, this 10% portion is representative of the signal strength received from fiber 12 and, by monitoring this portion, the total signal is effectively monitored as well. It has been found that a disruption of the optical signal path in fiber 12 results in at least a 3.0 dB change in signal strength, regardless of the type of disruption such as a crack or break, and regardless of the location of the disruption along the length of fiber 12.

Accordingly, signal processor 46 is configured to detect a predetermined power level change or deviation in the strength of the received signal. If such a predetermined deviation is detected, processor 46 produces an electrical output by way of line 56 which activates optical switch 48 to open which in turn, interrupts the signals conveyed to the associated receiver. When such occurs, receiver initiates an alarm mode as is conventional with such receivers whenever signal input ceases.

Having thus described the preferred embodiment of the present invention the following is claimed as new and desired to be secured by Letters Patent:

1. A method for use in conjunction with bi-directional transmission at nominally the same wavelength in both directions over a single optical fiber, wherein at least one end of the fiber is coupled to both a transmitter and a receiver, the method comprising:

transmitting optical signals from the transmitter, wherein a reflection at nominally the same wavelength of the transmitted signals is caused by a disruption in the fiber and is propagated back toward the receiver;

detecting and differentiating the reflection based on a signal strength of the reflection;

providing an output in response to the detection; and preventing the reflection from being processed by the receiver in response to the output.

2. A method for use in conjunction with bi-directional transmission at nominally the same wavelength in both directions over a single optical fiber, wherein at least one end of the fiber is coupled to both a transmitter and a receiver, the method comprising:

detecting a reflection of an optical signal transmitted from the transmitter, wherein the reflection is at nominally the same wavelength, the reflection is caused by a disruption in the fiber, and the reflection is propagated back toward the receiver, and wherein the detection is based on a signal strength of the reflection;

providing an output in response to the detection; and preventing the reflection from being processed by the receiver in response to the output.

3. An apparatus for use in conjunction with bi-directional transmission at nominally the same wavelength in both directions over a single optical fiber wherein at least one end of the fiber is coupled to both a transmitter and a receiver, the apparatus comprising:

a monitoring means for monitoring optical signals propagating toward the receiver;

a signal processing means connected to the monitoring means for a reflection among the monitored optical signals based on a signal strength of the reflection, wherein the reflection is at nominally the same wavelength, the reflection is caused by a disruption in the fiber, and the reflection is propagated back toward the receiver, and wherein the signal processing means is for providing an output in response to the detection; and a switching means coupled to the signal processing means and positioned in front of the receiver for preventing the reflection from being processed by the receiver in response to the output.

4. An apparatus for use in conjunction with bi-directional transmission at nominally the same wavelength in both directions over a single optical fiber, wherein at least one end of the fiber is coupled to both a transmitter and a receiver, the apparatus comprising:

an optical splitter operable to remove a portion of optical signals propagating toward the receiver;

a signal processor connected to the optical splitter operable to detect a reflection at nominally the same wavelength among the removed optical signals based on a signal strength of the reflection, wherein the reflection is caused by a disruption in the fiber and is propagating back toward the receiver, and wherein the signal processor is operable to provide an output in response to the detection; and a switch coupled to the signal processor and positioned in front of the receiver operable to prevent the reflection from being processed by the receiver response to the output.

* * * * *